United States Patent [19]
Bores

[11] Patent Number: 4,875,804
[45] Date of Patent: Oct. 24, 1989

[54] QUADRANGULAR STEPPED MOSAIC BREAKWATER

[76] Inventor: Pedro S. Bores, Vegafria 1, T 1, Madrid, Spain, E 28035

[21] Appl. No.: 946,446

[22] Filed: Dec. 24, 1986

Related U.S. Application Data

[63] Continuation-in-part of Ser. No. 923,678, Oct. 26, 1986, Pat. No. 4,801,220, which is a continuation-in-part of Ser. No. 861,139, May 8, 1986, which is a continuation-in-part of Ser. No. 786,840, Oct. 11, 1985, abandoned.

[30] Foreign Application Priority Data

Dec. 28, 1985 [ES] Spain .................................... 291366

[51] Int. Cl.⁴ .............................................. E02B 3/06
[52] U.S. Cl. ........................................ 405/31; 405/33
[58] Field of Search .................. 405/15, 16, 21, 23, 405/25, 30, 31, 33, 34, 35, 284, 286

[56] References Cited

U.S. PATENT DOCUMENTS

| | | | |
|---|---|---|---|
| 1,002,161 | 8/1911 | Lambert | 405/33 X |
| 2,645,114 | 7/1953 | Amirikian | 405/31 X |
| 3,375,667 | 4/1968 | Hard | 405/16 |
| 4,064,700 | 12/1977 | Sameshima | 405/30 |
| 4,073,145 | 2/1978 | Fair | 405/33 |
| 4,189,252 | 2/1980 | Inman | 405/33 |
| 4,341,489 | 7/1982 | Karnas | 405/33 X |

FOREIGN PATENT DOCUMENTS

| | | | |
|---|---|---|---|
| 1042479 | 10/1958 | Fed. Rep. of Germany | 405/30 |
| 397926 | 5/1909 | France | 405/30 |
| 580506 | 11/1924 | France | 405/30 |
| 618477 | 8/1978 | U.S.S.R. | 405/33 |
| 1695 | of 1882 | United Kingdom | 405/33 |
| 667512 | 3/1952 | United Kingdom | 405/33 |

Primary Examiner—David H. Corbin
Attorney, Agent, or Firm—Amster, Rothstein & Ebenstein

[57] ABSTRACT

A breakwater comprises a base and an interlocking plurality of vertically-oriented elements of generally quadrangular cross-section. The elements are mounted on a vertically-fixed upper surface of the base, form a monolithic horizontally-extending fascine, and define a vertically stepped mosaic crown.

1 Claim, 15 Drawing Sheets

4,875,804

QUADRANGULAR STEPPED MOSAIC BREAKWATER

REFERENCE TO RELATED APPLICATIONS

This application is a continuation-in-part of Ser. No. 923,678, filed Oct. 26, 1986, now U.S. Pat. No. 4,801,220, which is a continuation-in-part of Ser. No. 861,139, filed May 8, 1986, which is a continuation-in-part of Ser. No. 786,840, filed Oct. 11, 1985 (now abandoned).

BACKGROUND OF THE INVENTION

The invention relates to a QUADRANGULAR STEPPED MOSAIC BREAKWATER, a structure intended to create sheltered areas and/or spaces for nautical uses (harbours, jetties, etc.) residential uses (lalcustrine villaes, artificial islands, etc.), recreational uses (swimming pools, marine parks, aquaparks, etc.) as well as for the protection and/or improvement of the shores of natural (seas, lakes, lagoons, estuaaries, rivers, etc.) and/or artificial bodies of water (reservoirs, pools, canals, etc.) as a shore protection, training, support, shelter or bearing structure acting, if necessary, on the hydraulics of the shore (currents, wind waves, wake waves, etc.) and/or on the geomorphological processes: erosion, transport and/or deposit.

Offshore, bank protection, training, support, shelter and/or bearing structures are today built as breakwaters, jetties, which maybe natural or artificial rubblemound or monolithic. The latter may be vertical or mixed.

All these types of conventional breakwaters, jetties, are designed to specifically fulfil the function for which they are intended: signposting support, recreational facility support, etc., shore protection, training, support, shelter and/or bearing structures and, in certain cases, vessel berthing. They are dimensioned to withstand mainly the action of wind waves, waves, currents, etc. and, if necessary, berthing and/or mooring stresses. Their morphology has been specifically orientated towards these functions but other possible uses and/or requirements, recreational, aesthetic and environmental, for example, which are so highly valued today, have been disregarded.

Conventional, vertical and mixed, monolithic breakwaters in particular preset various additional disadvantages:

They are highly reflective for gravity waves (wind waves, wake waves, etc.) which greatly increase choppiness, crossed wave actions, possible resonances, etc. making it difficult to use the water surfaces to advantage and, at the same time, preventing beach stability.

They are relatively unstable, since on being buil with a quasi-rectangular superstructure, their overturning moment is not the optimum.

SUMMARY OF THE INVENTION

This invention relates particularly to BREAKWATERS composed of geometric qudrangular prismatic fascines, as well as to the elements of which they are constituted. The crown of these fascines is mainly horizontal or quasi-horizontal, and mosaic stepped, with the steps made up of one or more elements of the fascine or fascines, in a regular or random arrangement or in a combination of both, and their lateral faces are mainly vertical or quasi-vertical, whether flat, warped, broken or mixed and, when the quadrangular bases of the fascines are equal, they must fulfill the following conditions:

When the fascines are parallelepiped, the opposite faces of each element must be the same (face translation condition), whether these elements are adjacent, contiguous or secant. In the latter case, opposite bevelled surfaces whether flat, warped, broken or mixed, must be the same.

When the fascines are trapezoidal, each of the side faces of the elements of the fascines will have a polar symmetry axis, parallel to the axis of its fascine, coinciding with the center line of each of the faces (face rotating condition).

When the fascine elements are placed separately, not contiguous nor secant, the spaces between them may be different geometric figures, as in the case of the regular octagon, thus forming double, triple, etc. fascines, or simulating amorphous shapes (fluidal or concretional or simply irregular), acting as link or communication elements, etc. (fulfilling the monolithism condition of the fascine) or simply as fill. The same happens, when the case arises, with the interfascine spaces.

DETAILED DESCRIPTION OF THE PREFERRED EMBODIMENTS

Figure 1:
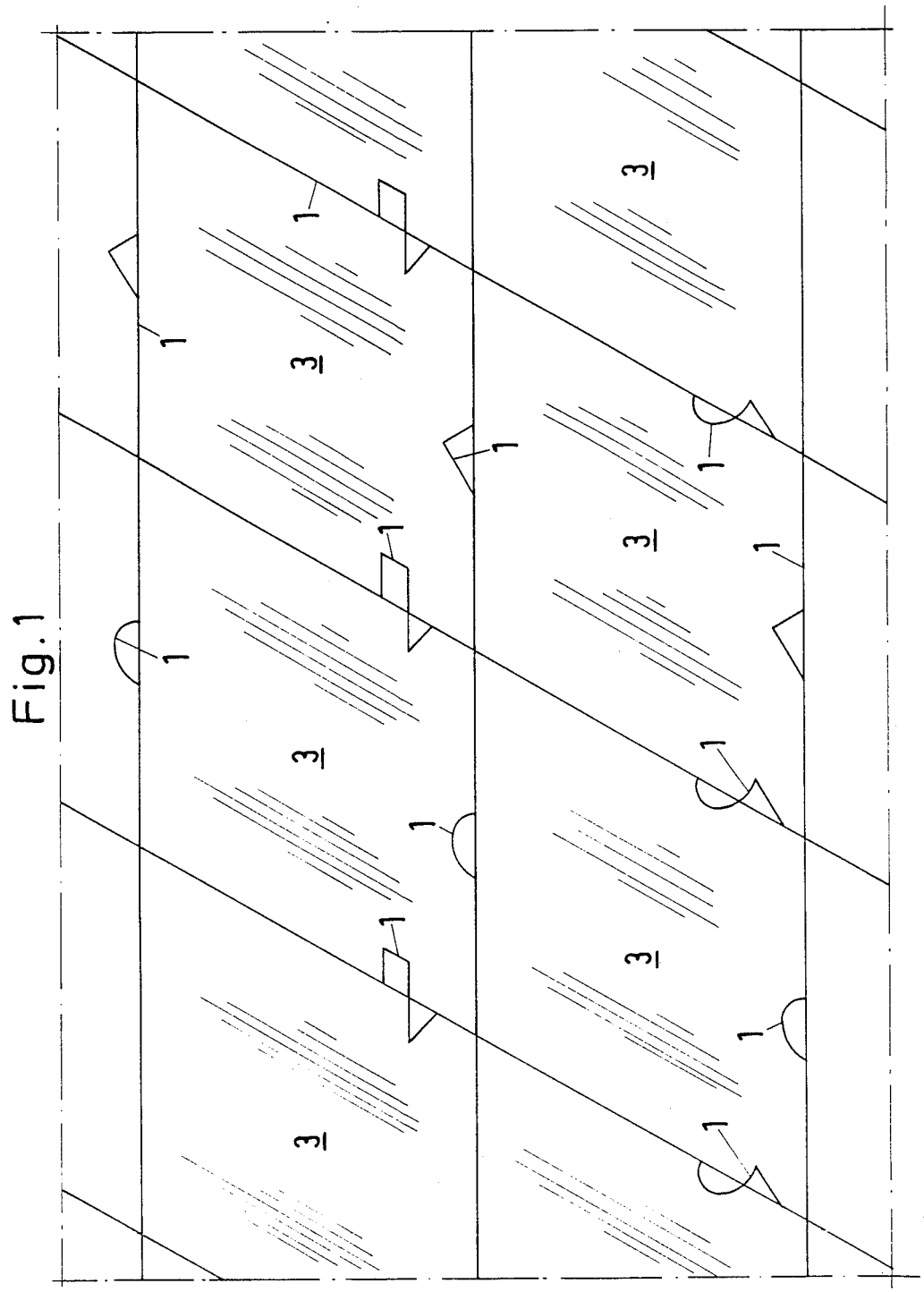
FIGS. 1–5 are sectional views of quadrangular prismatic fascines according to the presentn invention, where all the sections of the elements of the fascine are the same, FIGS. 1 and 2 illustraating parallelograms, FIG. 3 illustrating trapezoids, FIG. 4 illustrating double geometric fascines of squares and octagons, and FIG. 5 illustraating rectangular secant elements and mixed bevel faces.

Unlike conventional breakwaters, the BREAKWATER which is the subject of this invention peripherally offers outlines as randomly irregular as may be required, with mainly paarallel or quasi-parallel surfaces, small in size compared to those of the wave length, in two directions, corresponding to those of the side faces of the fascine, but arranged so that the general orientations of the facing, may be as variable as required, forming capes, coves, inlets, etc.

This happens not only on the outside but also in the inside areas (basins, coves, etc.) which prevents possible multiple reflections and/or resonances, thus giving the following additional advantages:

Allows better use (swimming, nautical, etc.) of the inside and outside environment of this BREAKWATER/JETTY.

Facilitates vessel berthing, even though this may be recommendable only in season.

Improves support of possible beaches, which is sometimes a problem with conventional breakwaters.

The crown of the breakwater, jetty, which is the subject of this invention, with its mosaic stepping, not only improves the stability of the structure, by suitable translation of the center of gravity of the cross section but, in addition, allows for:

The aesthetic and/or landscaping optimization of the environment, since the structure will simulate, as we shall see, as many forms created by Nature (petrographic, mineralogical) as by Man, blended into the environment or simply designed for it.

Occupation of the structure by users.

In fact, this occupation of the BREAKWATER itself for a variety of uses (swimming, fishing, sailing, games - aquaparks -solariums, etc.) substantially increases the capacity of the shore, whether of the sea, bodies of water (lakes, lagoons, reservoirs, etc.) fluvial (rivers, canals, estuaries, etc.) etc., offering considerable advantage over conventional breakwaters, jetties, whether rubblemound, vertical or mixed, particularly in those cases where, because there are no beaches or special shore features, this BREAKWATER provides the whole of the capacity.

The possible association and, in particular, unlimited subdivision of the quadrangular steps of this BREAKWATER enables, with shapes of the same geometry, not only very flat, levelled reliefs to be achieved, which can be used as jetties, etc. but also the most complex microreliefs which may be arranged, if necessary, as communication elements (stairways, etc.), elements for sojourn (gradins, etc.) or simply constructional, aesthetic or landscape elements, etc.

The use of the structure itself as one further element in the whole not only increases its capacity but also the aesthetic and landscaping quality, etc. of the offer, which considerably improves the profitability (economic and social, etc.) of this BREAKWATER.

In addition to the undoubted structural, functional and economical advantages and innovations that this BREAKWATER provides in comparison with conventional breakwaters, jetties, there are others which, in fact, characterize some of its possible and more important design alternatives.

If necessary, the fascine may be parallelepiped or quasi-parallelepiped and the side faces of its elements offer grooves coinciding with the stepping levels and- /or other levels equidistant or quasi-equidistant, parallel or quasi-parallel to the stepping. These grooves will have their borders (edges and vertices) rounded and may be so accentuated as to give a sensaation of a group of adjacent and/or superimposed blocks, simulating intrusive, plutonic igneous rocks like those formed by granites and/or similar rocks. In areas of this kind of rock, even if it does not reach the shore, this particular breakwater, jetty, which could be called GRANITE LANDSCAPE BREAKWATER, offers very important additional advantages since it may be possible for it not only to blend into the environment, but also recreate some of the more outstanding shapes in Nature.

When the quadrangular prismatic fascine is strictly parallelepipedic, its unlimited, indefinite, subdivision by a number of equidistant planes parallel to the relevant fascine faces is possible, thus geometrically identifying this particular fascine with different crystallographic systems: cubic or tetagonal (when the fascine is orthogonal and the base square), orthorhombic (orthogonal fascine, rectangular base), clinorhombic (oblique fascine, rectangular base), triclinic (oblique fascine, rhomboid base). Even the hexagonal system can be simulated by an orthogonal fascine or adjacent rhombi, when their greatest angles are of 120° and their shortest axes are concurrent in the center of the hexagon. This important property of quadrangular parallelepiped fascines of being geometrically similar to the crystallographic forms, allows the simulation of the crystallographic habits (mainly the prismatic: funddamental) as well as of properties usch as exfoliation (cubic, orthorhombic, basal, etc.), crystallographic partition and fracture (conchoidal, etc.) and/or of truncation, bevelling nd vertex notching. This simulation may likewise be extended to crystallographic aggregates (parallel homogenous aggregates, mimetic polygeminate twinnings, etc.) and, should usch be the case, to crystal growth imperfectioins themselves (hopper shaped faces, etc.) which constitute, shapewise, the possibility of designing MINERAL, CRYSTALLOGRAPHIC, BREAKWATERS.

Should the quadrangular prismatic fascine be trirectangular, the morpholopgy of the QUADRANGULAR STEPPED MOSAIC BREAKWATER geometrically identifies with one of the forms of occupation and/or planning of the space most appreciated and most frequently used by man, both ancient and modern, particularly in the Western culture. This implies notonly easy comprehension and acceptance of this shape order, even by the least educated social levels, but also the possibility of simulation, harmonization or contrast with shapes or formal elements of construction of alien or local urban landscapes, preferably local, if its qulaity so justifies.

The breakwater, jetty, which is the subject of this invention may be built by conventional methods: with floating caissons comprising one or more prismatic elements of the fascine, with prefabricated pieces which may or may not link the various prismatic elements and which may or not act as formworks. In certain cases, particularly when the depth is shallow, this BREAKWATER can be built "in situ", with the relevant formworks. In any even, a combination of two or more of these or other construction methods is possible.

By using expansion joints, the different parts of this BREAKWATER, formed by floating caissons, prefabricated elements, built "in situ", etc., will be joined, preferably at the top, the crown of the structure, which will thus act as a capping, or cappings, enabling the unit or units formed by the different elements to behave as a structure composed of a single or several monolithic units.

Like conventional vertical breakwaters, the QUADRANGULAR STEPPED MOSAIC BREAKWATER will be built on a foundation base or on a conventional submerged rubblemound breakwater, acting as the infrastructure. Economic and/or constructional reasons will decide on the solution to be adopted in each casae for the infrastructure of this BREAKWATER.

The most understanding advantages, the most notorious aspects of the QUADRANGULAR STEPPED MOSAIC BREAKWATER are ndoubtedly;

Its faculty for integral macroscopic and microscopic space occupation, whether its elements are separate (forming, if necessary, double octagonal/quadrangular fascines), contiguous and even, under certain conditions, secant, and whether their side faces are plane, warped, broken or mixed.

Its faculty for simulation and/or, should such be the casea, harmonization or contrast, both of the constructional shapes (urban, architectural, etc.) created by man and those formed by nature itself: mineral crystalline forms, "block morphology" of granite and similar rocks.

It is possible for this simulation, harmonization or contrast not just to be limited to general aspects of shape but also to be extended, should such be the case, to details as signficant as the color, surface texture, microrelief, etc.

In the particular case of simulating granite or similar rocks, "chairs" or "bathtubs" may be included, which cna be flooded, forming natural swimming pools, and, when desired, embellished by vegetation.

In extreme cases of simulation, natural elements may be used: The crown of this GRANITIC LANDSCAPE BREAKWATER may include natural boulders, quarried or selected at granite rock sites, with a suitable surface treatment if necesssary.

Some of these advantages and others may be observed from an examination of the figures relating to this invention.

FIG. 1 shows the cross section of a quadrangular prismatic fascine formed by parallelograms where it can be seen that the opposite sides of the parallelograms are identical, fulfilling the translation condition, number 1. The cross section of the elements constituting the fascine are shown with the number 3. This figure shows the variety of possibilities for designing the quadrangular fascine which enables all cross sections of the elements to be different.

Figure 2:
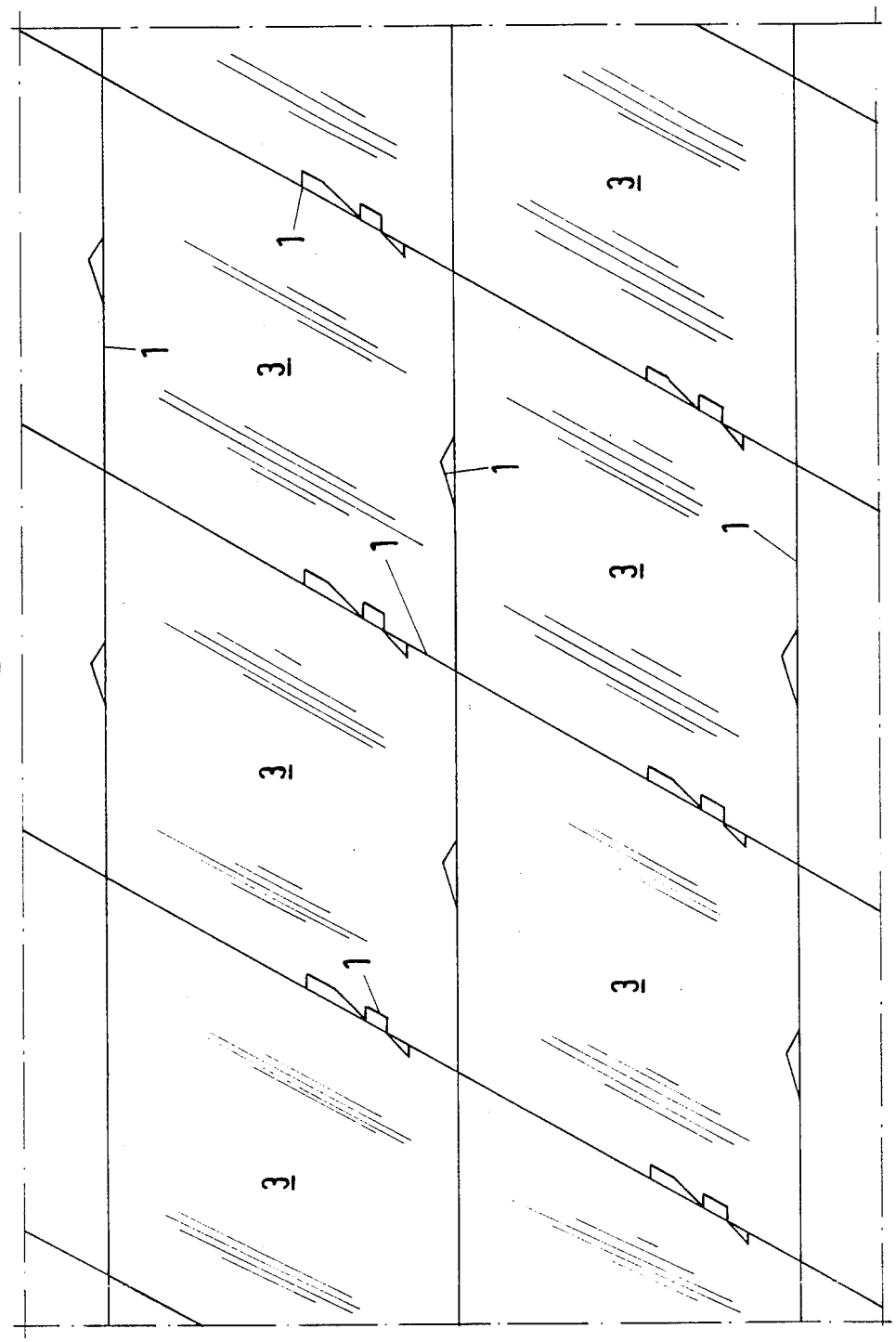

FIGS. 2 to 5 show some of the more interesting construction possibilities for the quadrangular fascine, when all the sections of the elements of the fascine are the same, allowing for easy prefabrication and/or formwork. FIG. 2 involves parallelograms, FIG. 3 trapezoids, FIG. 4 separate equidistant elements (double geometric fascines of square and octagons, if necessary, regular) and FIG. 5, rectangular secant elements and mixed bevel faces.

Figure 3:
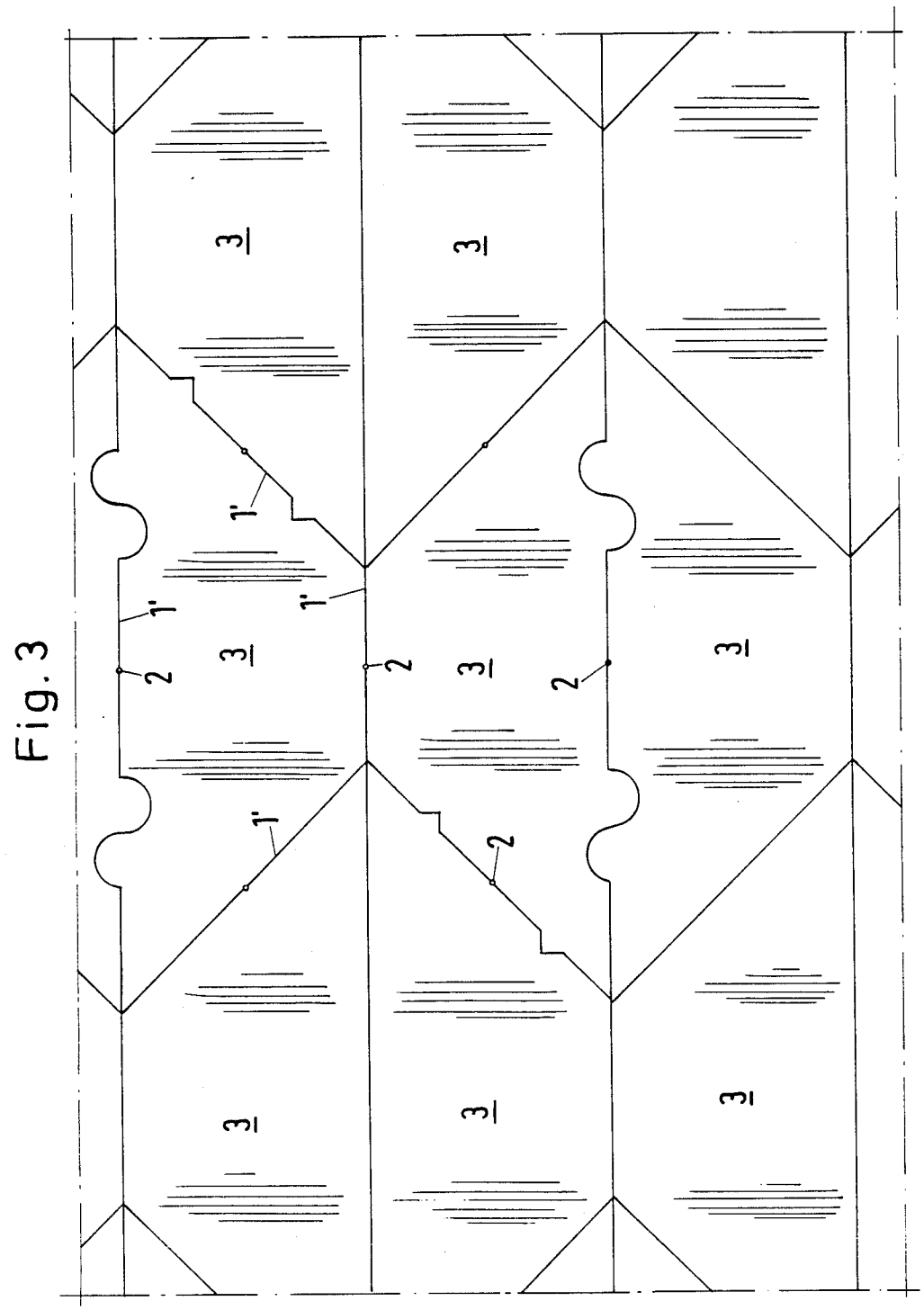
Figure 4:
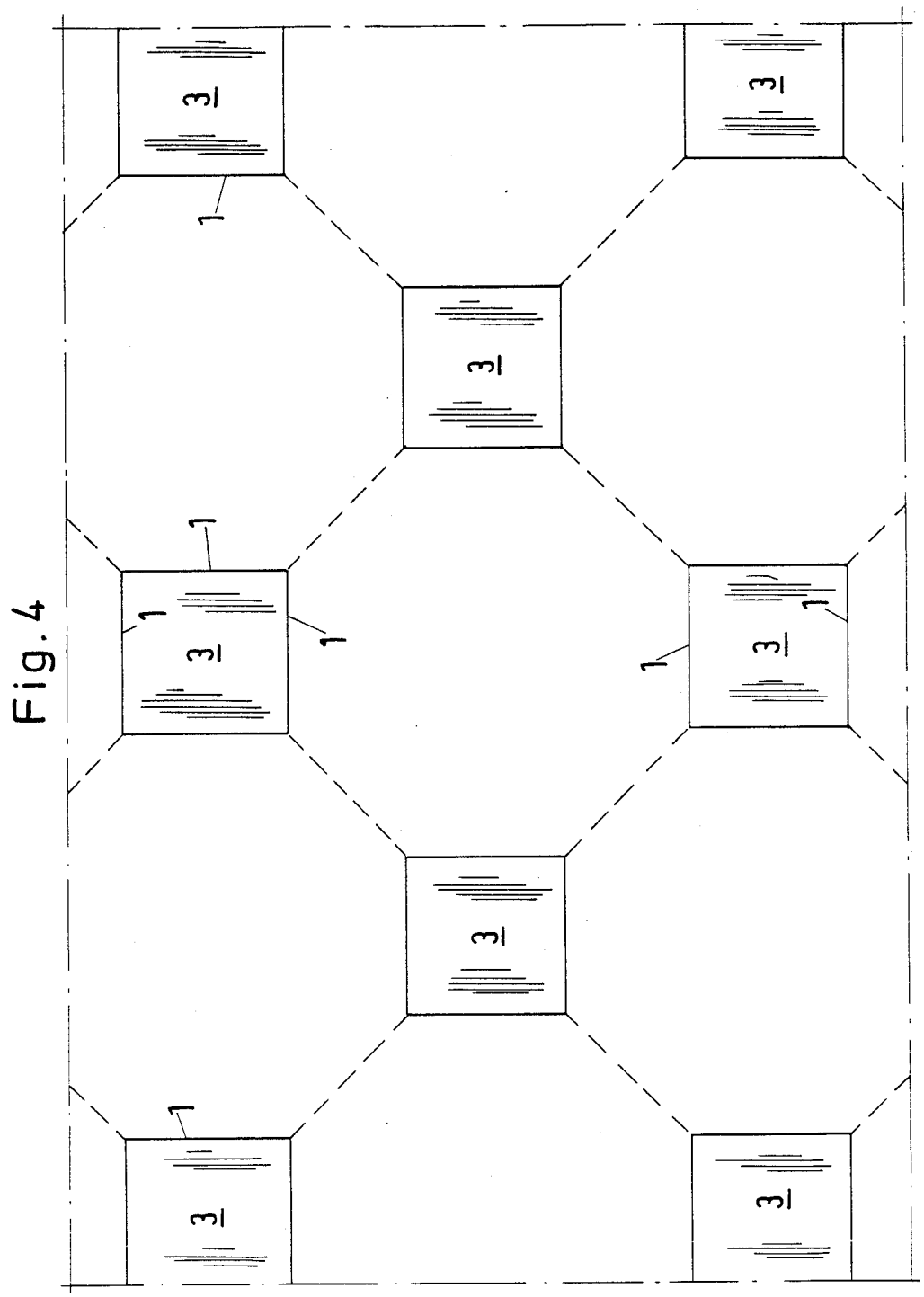
Figure 5:
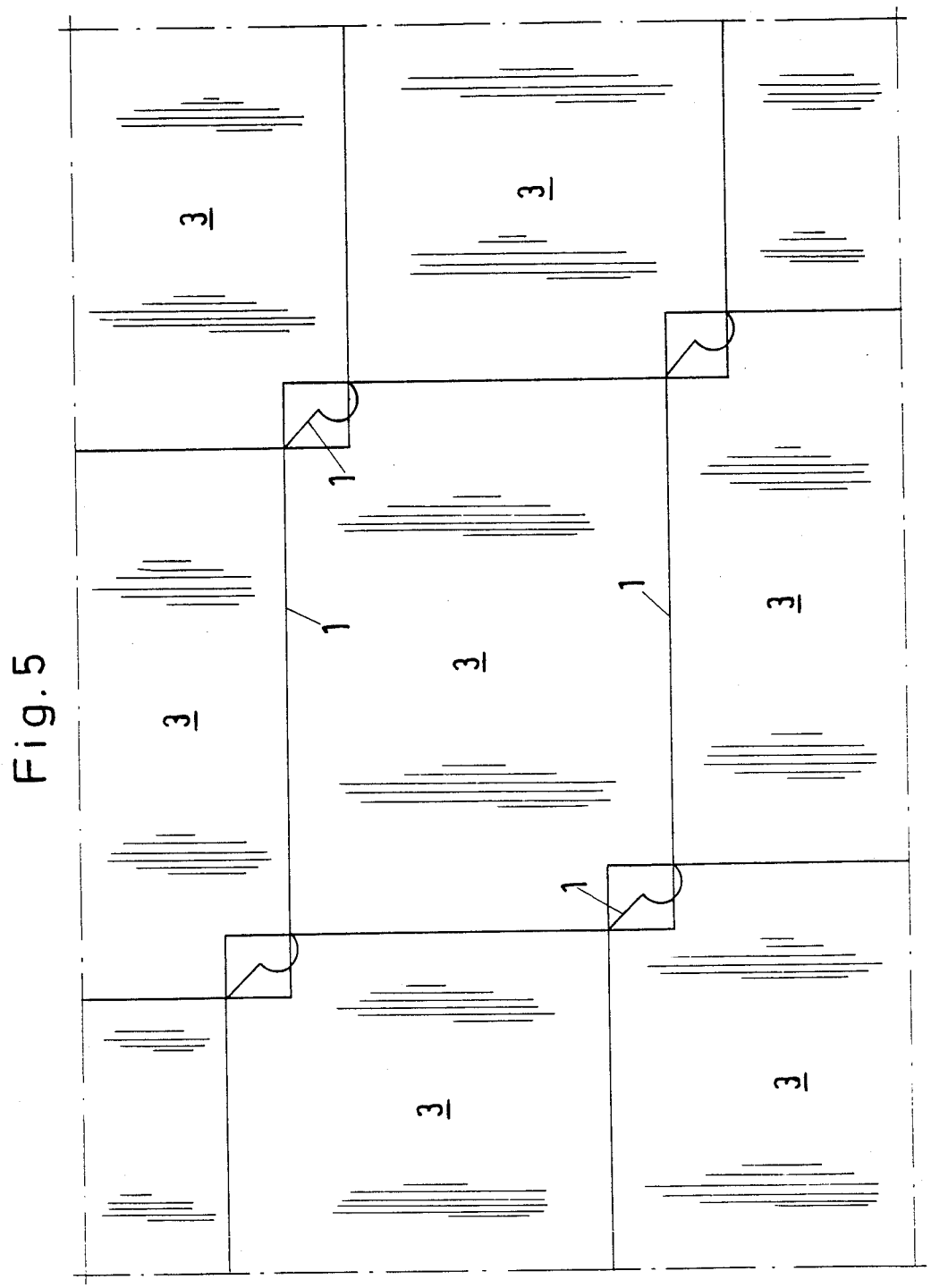

Number 1 in the said FIGS. 2 to 5 indicates identical faces, by translation, including those bevelled. FIG. 3, number 1' indicates the faces with a polar symmetry center and number 2 the actual polar symmetry centers themselves. Number 3, in all figures, indicates the elements making up the fascine.

Figure 6:
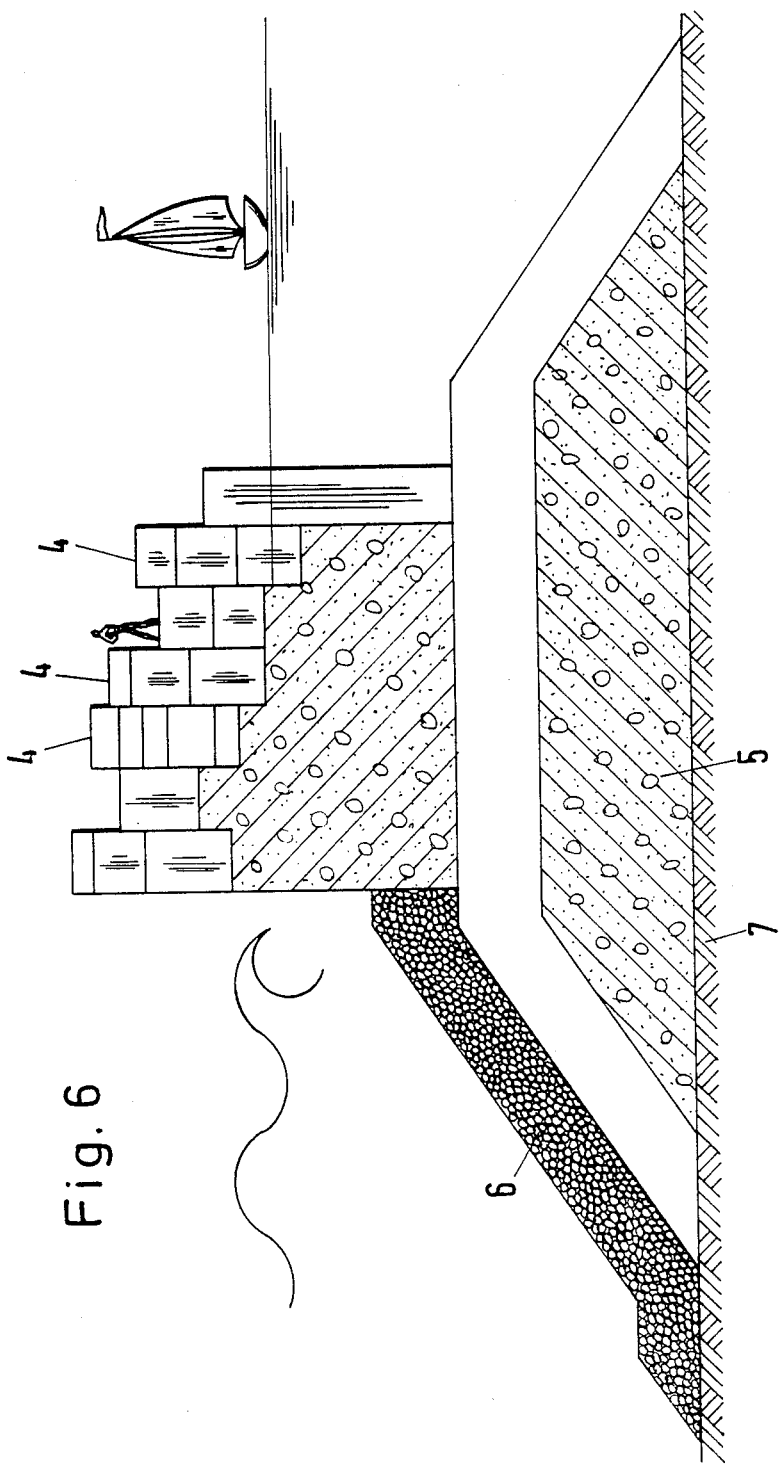
FIGS. 6–8 are side elevation views, partially in cross-section, of breakwaters according to the present invention, FIG. 6 illustrating a rubblemound bottom and FIGS. 7 and 8 illustrating a simple base foundation.
Figure 7:
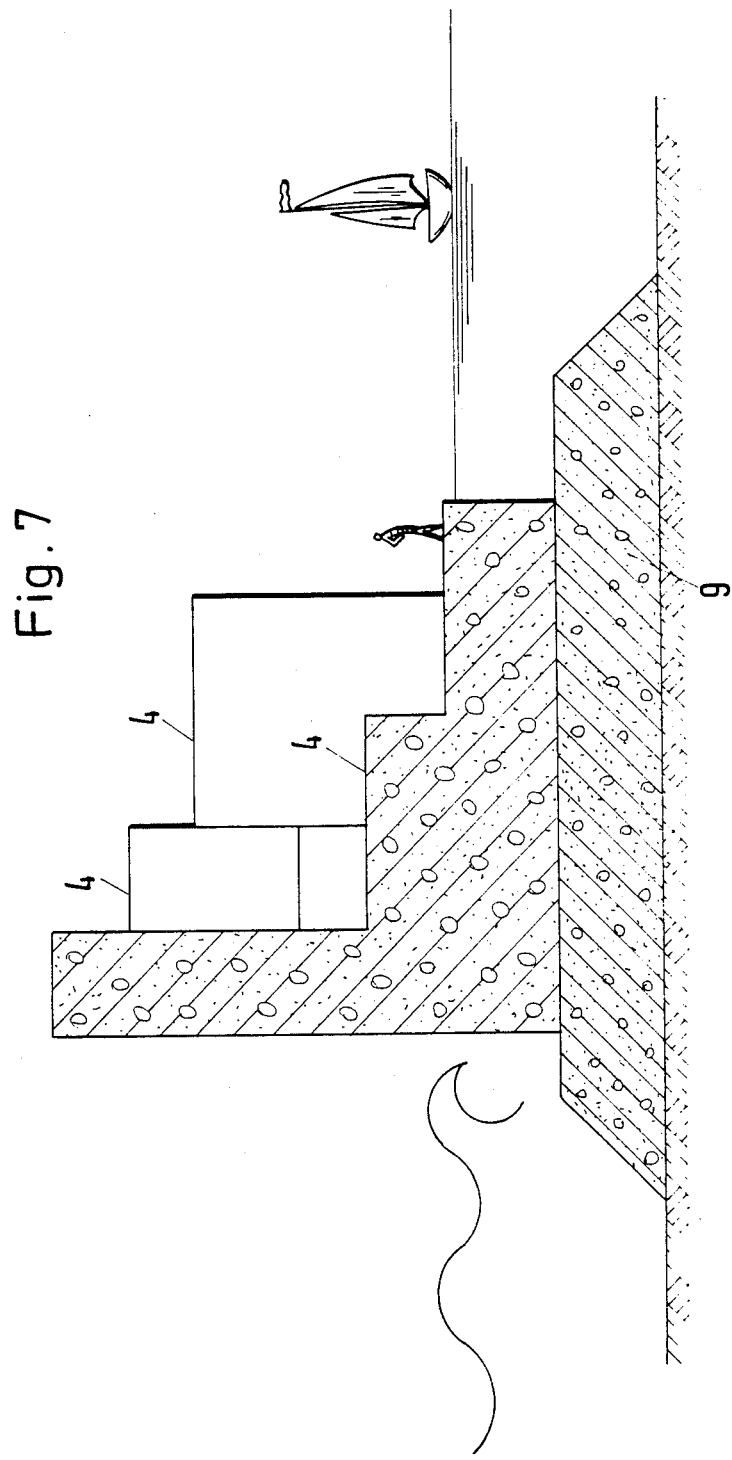
Figure 8:
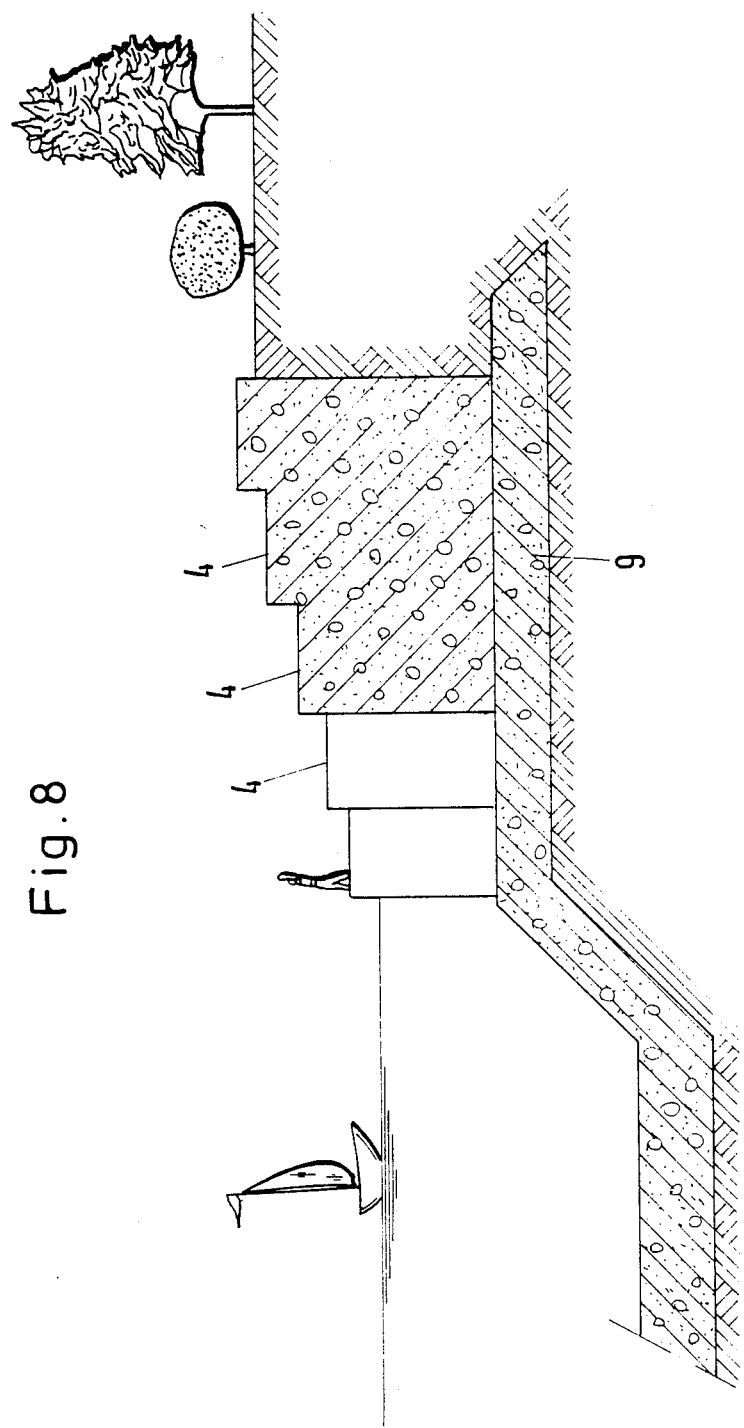

FIGS. 6 to 8 show the cross sections of the QUADRANGULAR STEPPED MOSAIC BREAKWATER applied to different functions: acting as a shelter breakwater, jetty, in FIGS. 6 and 7, acting as a shore, bank, protection, in FIG. 8, and with various kinds of infrastructure: rubblemound breakwater, in FIG. 6, with the core indicated by the number 5, the armour layer by the number 6 and the secondary layers by the number 7, or by a simple based foundation, number 9, in FIGS. 7 and 8.

The stepping in FIGS. 6 to 8, formed with one or several elements of the geometric fascine, designated with number 4, is on two sides in the FIG. 6 cross section and on one side in FIGS. 7 and 8, in order to resist the hydraulic action, FIG. 7 and the earth thrust, FIG. 8.

Figure 9:
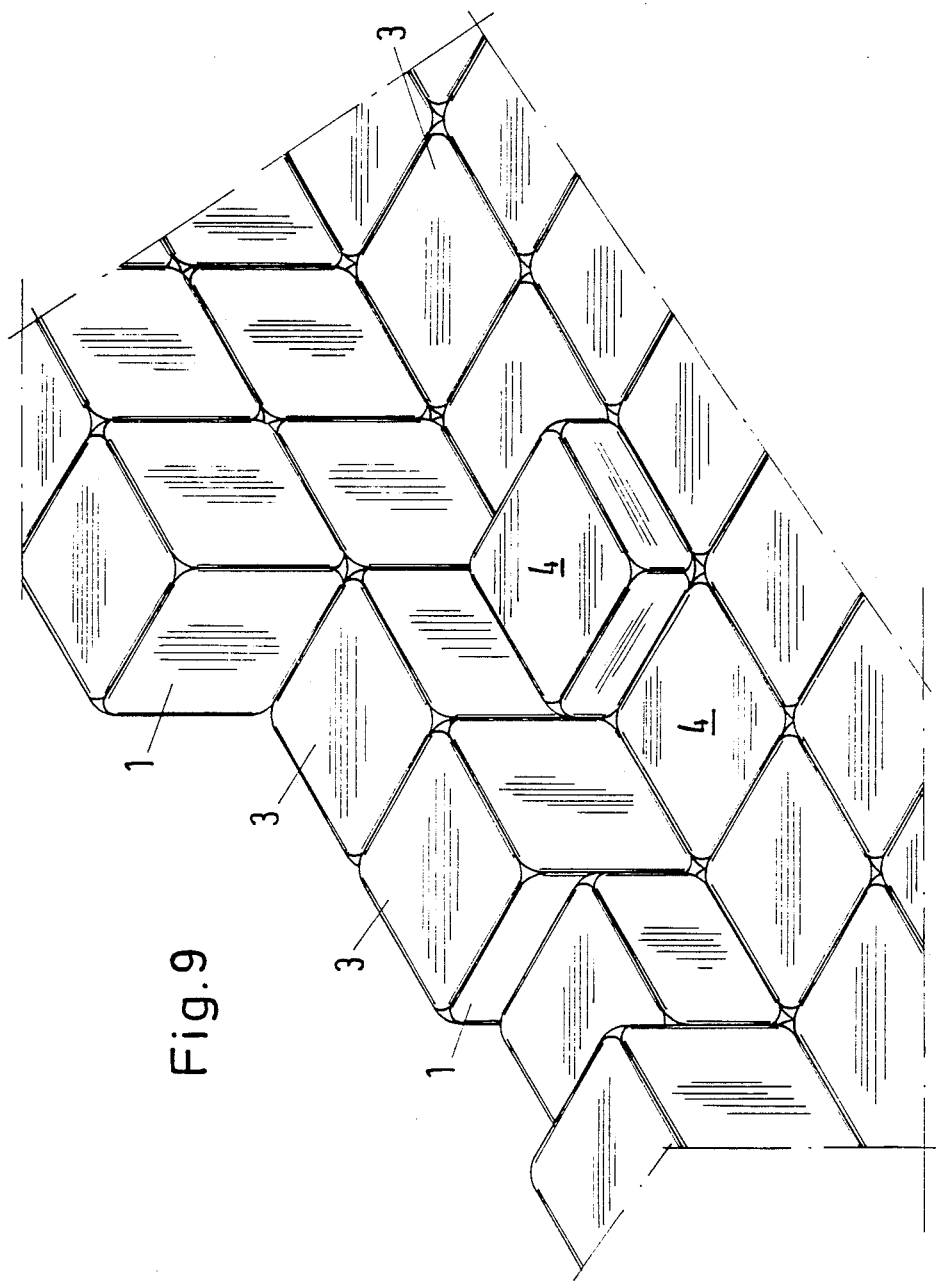
FIGS. 9–11 are schematic isometric views of breakwaters according to the present invention, FIG. 9 illustrating a simple block morphology, FIG. 10 illustrating both the "chair" and "hanging blocks" reliefs, and FIG. 11 illustrating a "bathtub" relief.

A detail of the typical "block morphology" is given in FIG. 9. This is characteristic of intrusive plutonic igneous rock formations such as granites and similar rocks, with their vertices and/or edges rounded. The lateral faces are represented in that figure by the number 1, the constitutive elements of the quadrangularl geometric fascine by the number 3 and the horizontal crown surfaces, forming the mosaic stepping, by the number 4.

Figure 10:
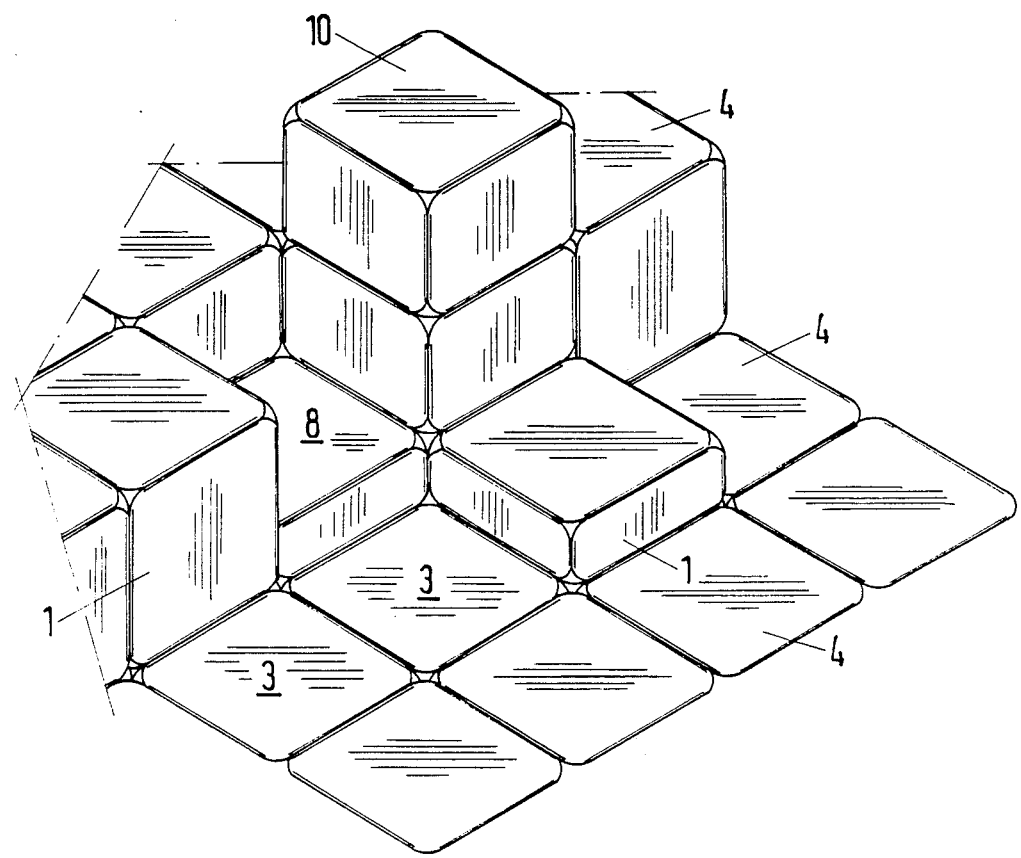

FIG. 10 shows the "chair" relief, designated by the number 8, and the "hanging blocks" relief, designated by the number 10.

Figure 11:
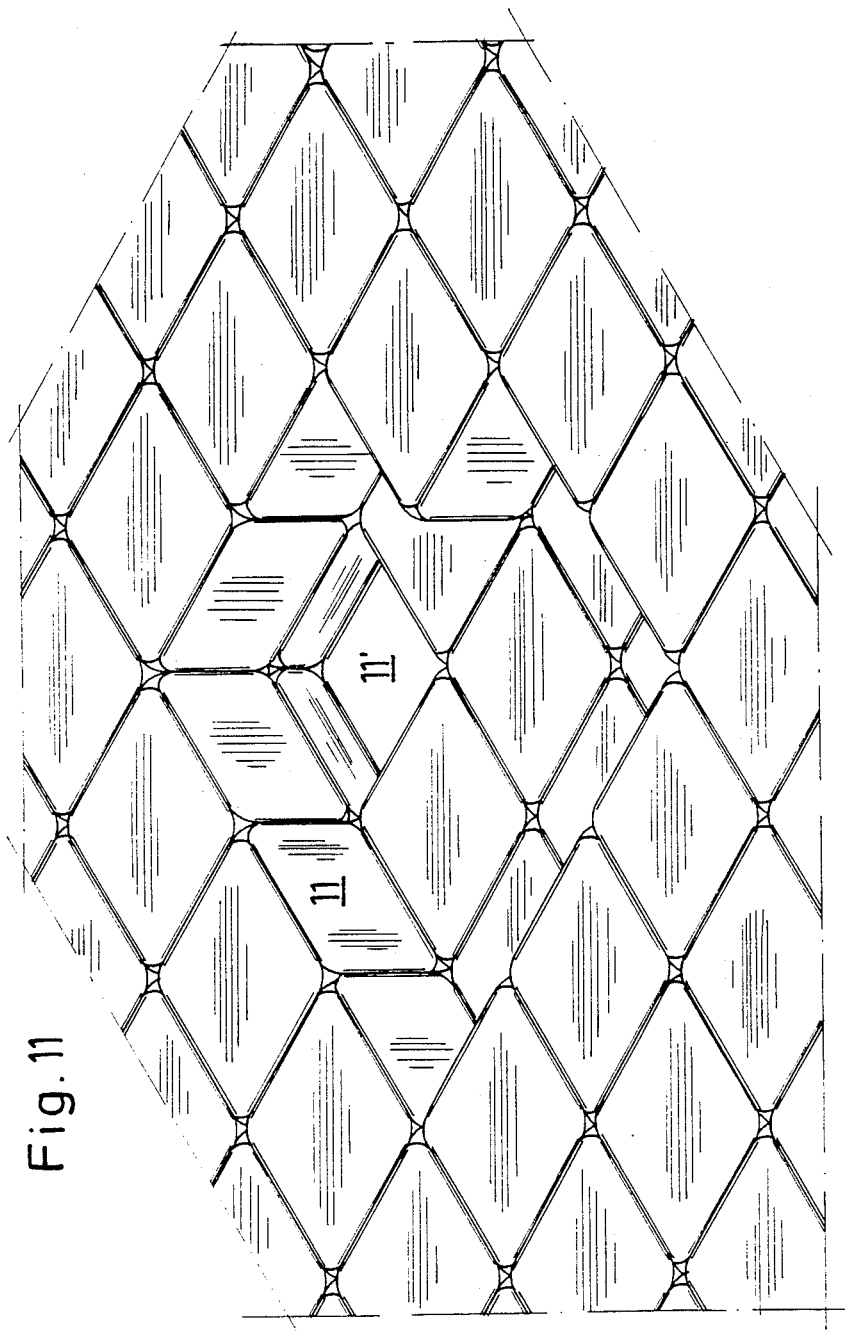

In FIG. 11, numbers 11 and 11' show a a "bathtub" relief, formed by depressions in the quadrangular prismatic fascine, with two levels of depression indicated with the numbers 11 and 11'. These "bathtubs" may be empty or filled with sand, plants or just water, simulating natural swimming pools.

Figure 12:
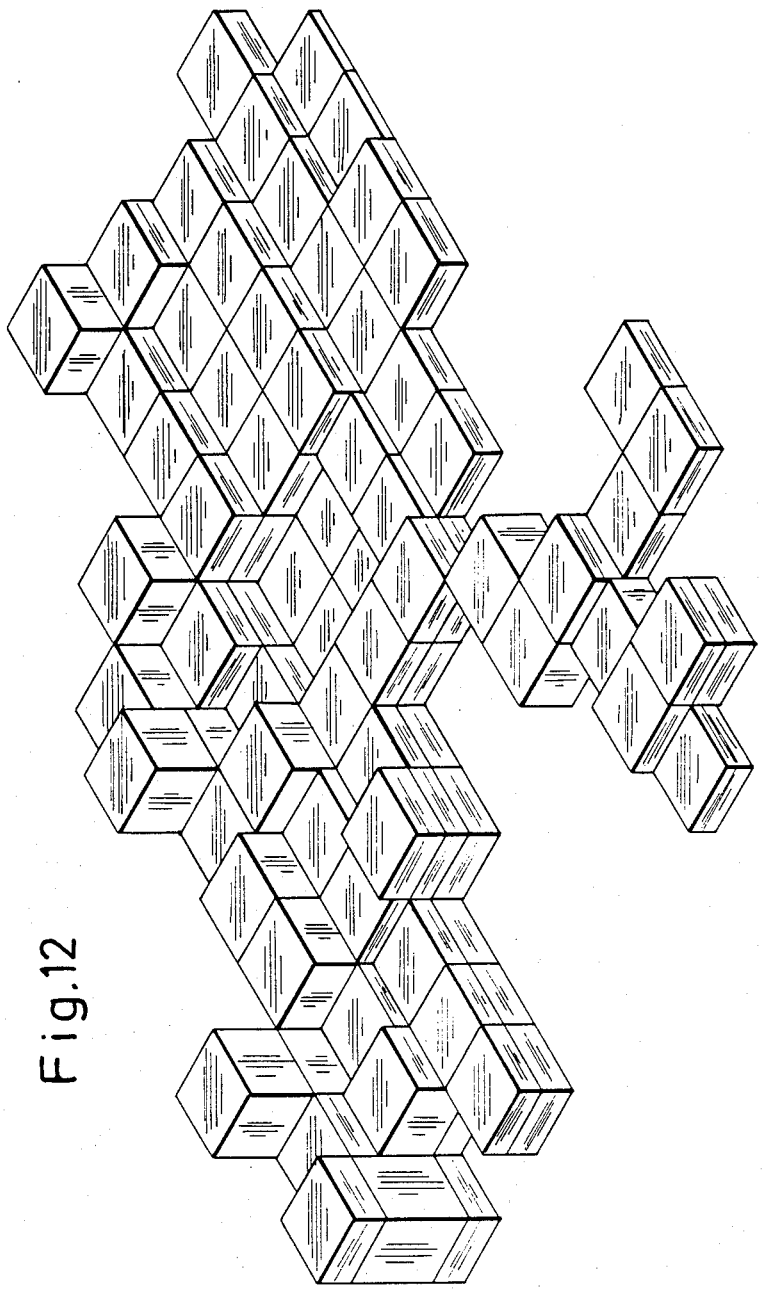
FIGS. 12–15 are schematic isometric views of breakwaters according to the present invention illustrating various breakwater configurations.

FIG. 12 shows a view of a QUADRANGULAR STEPPED MOSAIC BREAKWATER, in accordance with this invention, simulating a landscape like those formed by intrusive, plutonic igneous rocks, such as granites and similar rocks.

Figure 13:
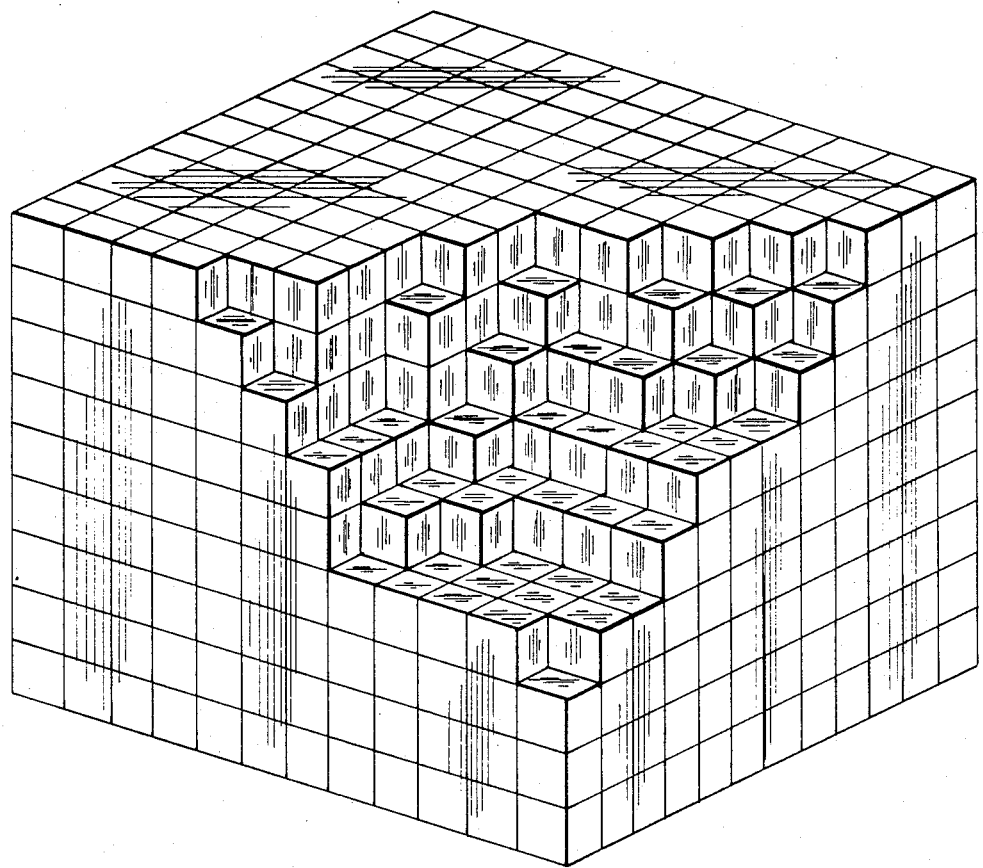

FIG. 13 shows a QUADRANGULAR STEPPED MOSAIC BREAKWATER simulaating forms of crystallographic exfoliation.

Figure 14:
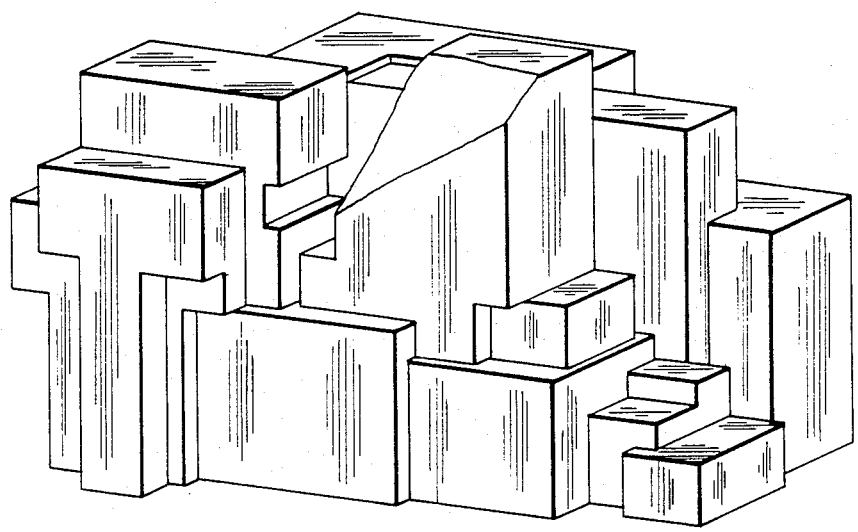
Figure 15:
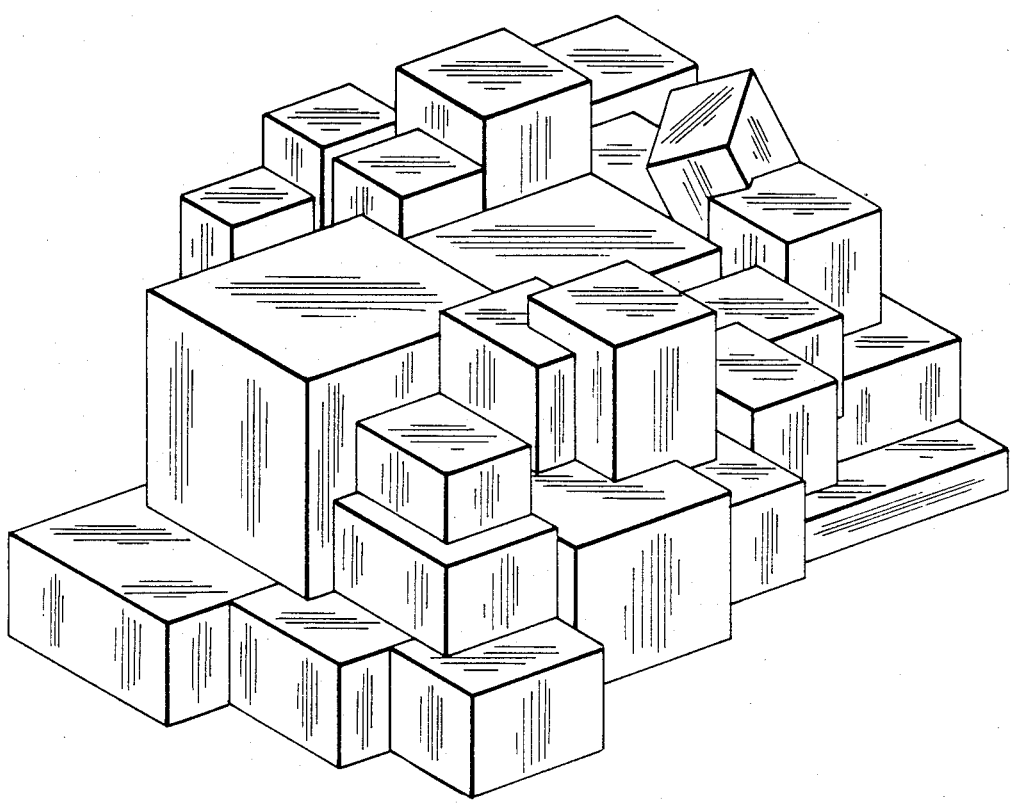

FIGS. 14 and 15 show two views of a QUADRANGULAR STEPPED MOSAIC BREAKWATER inspired in crystalline shapes and aggregates highly contrasted by marked exfoliation and twinning.

I claim:
1. A breakwater comprising
   (A) a base having a vertically-fixed upper surface; and
   (B) an interlocking plurality of vertically-oriented, water-impermeable elements of substantially identical, generally quadrangular cross-section, said elemelnts being mounted on said base, disposed in a monolithic horizontally-extending fascine and defining a vertically stepped mosaic crown; each of said elements commencing at said base and terminating in said crown, including at least one substantially planar vertically-extending side defining a key and at least one other substantially planar vertically-extending side defining a complementary key-receiving keyway, and sharing with another of said elements at least one contiguous interlocked side, said at least one and at least one other substantially planar vertically-extending sides being essentially planar and vertical except for said key and keyway, respectively, said key and keyway extending no more than one third of their respective sides, said interlocking plurality of elements defining a barrier through which water cannot flow.

* * * * *